United States Patent
Kobayashi et al.

(10) Patent No.: US 6,221,963 B1
(45) Date of Patent: Apr. 24, 2001

(54) THERMOPLASTIC ELASTOMER BASED ON OLEFIN AND PROCESS FOR PRODUCING THE SAME

(75) Inventors: Kyoko Kobayashi; Akira Uchiyama, both of Ichihara (JP)

(73) Assignee: Mitsui Chemicals, Inc., Tokyo (JP)

(*) Notice: Subject to any disclaimer, the term of this patent is extended or adjusted under 35 U.S.C. 154(b) by 0 days.

(21) Appl. No.: 09/340,044

(22) Filed: Jun. 28, 1999

(30) Foreign Application Priority Data

Jun. 30, 1998 (JP) .................................................. 10-184292
Mar. 18, 1999 (JP) .................................................. 11-072919

(51) Int. Cl.⁷ .............................. C08F 8/00; C08L 23/00; C08L 23/04
(52) U.S. Cl. ........................................ 525/191; 525/240
(58) Field of Search ...................................... 525/191, 240

(56) References Cited

U.S. PATENT DOCUMENTS 5,288,806   2/1994   Peacock .

FOREIGN PATENT DOCUMENTS

0751182A1   1/1997   (EP) .
0837098A1   4/1998   (EP) .

Primary Examiner—Nathan M. Nutter
(74) Attorney, Agent, or Firm—Birch, Stewart, Kolasch & Birch, LLP

(57) ABSTRACT

A thermoplastic elastomer based on olefin which can be produced simply by melt-kneading 5–60% by weight of a polyethylene resin (A) together with 40–95% by weight of an ethylene/α-olefin copolymer (B) with optional subsidiary component(s) before the kneaded mass is molded into a formed product, the said elastomer being capable of recycling for reclamation and exhibiting the following characteristics ① to ③ namnely, $$9 \leq Y - 0.43\,X \leq 27 \tag{1}$$

① in which X denotes the JIS A-hardness value (a dimensionless value) of the thermoplastic elastomer based on olefin determined according to the prescription of JIS K 6301 and Y represents the permanent compressive strain value (expressed by %) of the thermoplastic elastomer based on olefin determined according to the prescription of JIS K 6301 under a condition of 70° C.×22 hours, ② tensile strength in the raqnge from 5 to 30 MPa and ③ a permanent elongation of 18% or less determined according to the prescription of JIS K 6301.

12 Claims, No Drawings

THERMOPLASTIC ELASTOMER BASED ON OLEFIN AND PROCESS FOR PRODUCING THE SAME

FIELD OF THE INVENTION

The present invention relates to a thermoplastic elastomer based on olefin, a composition of thermoplastic elastomer and a process and method for producing such elastomer and composition. More specifically, the present invention relates to a thermoplastic elastomer based on olefin, which comprises a polyethylene resin and a copolymer based on ethylene/α-olefin and which is superior in the rubbery elasticity, to a composition as a starting mixture therefor and to a process and method for producing such elastomer and composition.

BACKGROUND OF THE INVENTION

Wide varieties of materials have been employed heretofore for parts and portions of installations and furnishings in the automobile, machinery, electric and electronic industries and architectural field requiring rubbery elasticity. Among them, vulcanized rubber may be exemplified. Vulcanized rubber is obtained usually through laborious and expensive process steps by first preparing an unvulcanized rubber blend by kneading raw rubber together with a cross linking agent, cross linking assistant, additives and subsidiary component(s) and then processing the resulting kneaded mass by vulcanization while forming it into a contemplated formed product under heating. Vulcanized rubber products have cross-linked molecular structure and, therefore, are not able to be recycled for reclamation.

On the other hand, polyvinyl chloride resin has a rubber-resembling property, though it does not require vulcanization step. However, polyvinyl chloride resin suffers from a significant problem of evolving a noxious gas upon incineration thereof. In addition, the rubbery elasticity thereof is inferior as compared with vulcanized rubber, so that the application field thereof is limited.

There have been known thermoplastic elastomers which behave at normal temperature as a polymer material exhibiting a rubbery elasticity but can be plasticized at a high temperature and, thus, can be processed by forming or molding into formed product. As concerns this, there has been known, as a thermoplastic elastomer based on olefin, a dynamically cross-linked product made of a polypropylene and an ethylene/α-olefin copolymer. However, this also suffers from similar problems as above due to incorporation of a dynamic cross linking step.

SUMMARY OF THE INVENTION

An object of the present invention is to solve the above-mentioned problems of the stand of the technique and to provide a thermoplastic elastomer based on olefin, which is superior in the rubbery elasticity and which can be obtained simply in an economical way without using cross linking agent and, thus, can permit recycled use.

Another object of the present invention is to provide a composition of thermoplastic elastomer based on olefin from which the above-mentioned thermoplastic elastomer based on olefin can be obtained.

A further object of the present invention is to provide a method for producing the above-mentioned composition of thermoplastic elastomer based on olefin in an efficient way.

A yet further object of the present invention is to provide a process for producing the above-mentioned thermoplastic elastomer based on olefin permitting recycled use, whereby the said elastomer can be produced in a simple, efficient and economical way by a single process step without using cross linking agent.

Thus, the present invention consists in the thermoplastic elastomer based on olefin, in the composition therefor and in the method and process for producing such elastomer and composition as given below:

(1) A thermoplastic elastomer based on olefin which exhibits the following characteristics ① to ③ namely, $$9 \leq Y - 0.43\,X \leq 27 \tag{1}$$

① in which X denotes the JIS A-hardness value (a dimensionless value) of the thermoplastic elastomer based on olefin determined according to the prescription of JIS K 6301 and Y represents the permanent compressive strain value (expressed by %) of the thermoplastic elastomer based on olefin determined according to the prescription of JIS K 6301 under a condition of 70° C.×22 hours, ② a tensile strength in the range from 5 to 30 MPa determined according to the prescription of JIS K 6301, and ③ a permanent elongation value of 18% or less determined according to the prescription of JIS K 6301.

(2) A thermoplastic elastomer based on olefin which comprises a polyethylene resin (A) and a copolymer (B) based on ethylene/α-olefin and which exhibits the characteristics ① to ③ described above.

(3) The thermoplastic elastomer based on olefin as defined in the above (2), which is obtained from a mixture composed of 5–60% by weight of a polyethylene resin (A) and 40–95% by weight of a copolymer (B) based on ethylene/α-olefin having a Mooney viscosity $ML_{1+4}$ (100° C.) of 90–250 and an ethylene content of 70–95 mole % by subjecting this mixture to a dynamic heat treatment in the absence of cross linking agent.

(4) The thermoplastic elastomer based on olefin as defined in the above (2) or (3), which is obtained by subjecting the polyethylene resin (A) together with the copolymer (B) based on ethylene/α-olefin to a dynamic heat treatment on a double-screw extruder in the absence of cross linking agent under a process condition satisfying the provision ④ given below:

$$4.8 < \{(T-130)/100\} + 2.2\log P + \log Q - \log R < 7.0 \tag{2}$$

④ in which T represents the temperature (° C.) of the resin mixture at the die outlet, P is the screw diameter (mm) of the double screw extruder, Q is the maximum shearing velocity (sec$^{-1}$) at which the resin mixture is kneaded in the double screw extruder and is defined by the formula Q=P×π×S/U with P being as above, S being the number of revolutions per second (r.p.s) of the screw and U being the gap (mm) between the inner face of the barrel wall and the kneading segment of the screw at the narrowest portion thereof and R is the extrusion through-put (kg/hr) of the double screw extruder.

(5) A composition of thermoplastic elastomer based on olefin comprising 5–60% by weight of a polyethylene resin (A) and 40–95% by weight of a copolymer (B) based on ethylene/α-olefin having a Mooney viscosity $ML_{1+4}$ (100° C.) of 90–250 and an ethylene content of 70–95 mole %.

(6) A composition of thermoplastic elastomer based on olefin obtained from a mixture composed of 5–60% by weight of a polyethylene resin (A) and 40–95% by weight of a copolymer (B) based on ethylene/α-olefin having a Mooney viscosity $ML_{1+4}$ (100° C.) of 90–250 and an ethylene content of 70–95 mole % by subjecting this mixture to a dynamic heat treatment in the absence of cross linking agent.

(7) A composition of thermoplastic elastomer based on olefin as defined in the above (5) or (6), wherein the copolymer (B) based on ethylene/α-olefin consists of an ethylene/α-olefin/non-conjugated polyene copolymer.

(8) The composition of thermoplastic elastomer based on olefin defined in either one of the above (5) to (7), wherein it contains 30 parts by weight or less of a polypropylene resin (C) per 100 parts by weight of the total sum of the polyethylene resin (A) plus the copolymer (B) based on ethylene/α-olefin.

(9) A process for producing a composition of thermoplastic elastomer based on olefin, comprising subjecting a mixture composed of 5–60% by weight of a polyethylene resin (A) and 40–95% by weight of a copolymer (B) based on ethylene/α-olefin having a Mooney viscosity $ML_{1+4}$ (100° C.) of 90–250 and an ethylene content of 70–95 mole % to a dynamic heat treatment in the absence of cross linking agent.

(10) A process for producing a thermoplastic elastomer based on olefin, comprising subjecting a composition of thermoplastic elastomer comprising a polyethylene resin (A) and a copolymer (B) based on ethylene/α-olefin to a dynamic heat treatment in the absence of cross linking agent, wherein the so-obtained thermoplastic elastomer exhibits the characteristics ① to ③ as given above.

(11) A process for producing thermoplastic elastomer based on olefin, comprising subjecting a mixture composed of 5–60% by weight of the polyethylene resin (A) and 40–95% by weight of the copolymer (B) based on ethylene/α-olefin having a Mooney viscosity $ML_{1+4}$ (100° C.) of 90–250 and an ethylene content of 70–95 mole % to a dynamic heat treatment in the absence of cross linking agent and forming the resulting composition of thermoplastic elastomer into a formed product exhibiting the characteristics ① to ③ as given above.

(12) The process as defined in the above (10) or (11), wherein the dynamic heat treatment is realized on a double-screw extruder in the absence of cross linking agent under a process condition satisfying the provision ④ as given above.

DETAILED DESCRIPTION OF THE INVENTION

<<The Polyethylene Resin (A)>>

For the polyethylene resin (A) to be employed according to the present invention, known polyethylene resins can be used without any restriction, such as a high density polyethylene, a medium density polyethylene, a low density linear polyethylene and a low density polyethylene, wherein preference is given to low-density linear polyethylene, in particular, to that obtained using a metallocene catalyst.

For the polyethylene resin (A), one which has a melt flow rate (MFR, determined according to ASTM D 1238 at 190° C. under a load of 2.16 kg) in the range from 0.01 to 100 g/10 min., preferably from 0.01 to 50 g/10 min. In using as the polyethylene resin (A) an ultra-high molecular weight polyethylene having an MFR lower than 0.1 g/10 min., which has ordinarily an intrinsic viscosity [η], determined in decalin (decahydronaphthalene) at 135° C., in the range from 7 to 40 dl/g, such an ultra-high molecular weight polyethylene may preferably be used as a mixture composed of 15–40% by weight of a low to high molecular weight polyethylene having an intrinsic viscosity [η], determined in decalin at 135° C., in the range from 0.1 to 5 dl/g and of 85–60% by weight of an ultra-high melecular weight polyethylene of intrinsic viscosity in the range from 7 to 40 dl/g, wherein the intrinsic viscosity [η] of the mixture as a whole may preferably be in the range from 3.5 to 8.3 dl/g.

The polyethylene resin (A) may favorably have a density in the range from 0.88 to 0.98 $g/cm^3$, preferably from 0.90 to 0.95 $g/cm^3$.

When a low density linear polyethylene is to be used as the polyethylene resin (A), it is favorable to use one which has an MFR, determined according to ASTM D 1238 at 190° C. under a load of 2.16 kg, in the range from 0.1 to 30 g/10 min., preferably in the range from 0.2 to 20 g/10 min., and a density in the range from 0.88 to 0.95 $g/cm^3$, preferably in the range from 0.91 to 0.94 $g/cm^3$.

When a low density linear polyethylene is used for the polyethylene resin (A), a formed article exhibiting superior appearance can be obtained without occurrence of neither a rough nor a sticky surface by extrusion molding or injection molding, as contrasted to the case of using a medium or a high density polyethylene.

The polyethylene resin (A) may be either a homopolymer of ethylene or a copolymer of a predominant proportion of ethylene with minor proportion, for example, not higher than 10 mole %, of other comonomer(s). For such comonomer, there may be enumerated α-olefins having 3–20 carbon atoms, preferably 3–8 carbon atoms, and vinyl monomers, such as vinyl acetate and ethyl acrylate. For the α-olefin to be incorporated as other comonomer, there may be exemplified propylene, 1-butene, 4-methyl-1-pentene, 1-hexene and 1-octene. Such other comonomer may be incorporated either alone or in a combination of two or more.

The polyethylene resin (A) may be either one single polyethylene product or a blend of polyethylene products.

<<The Copolymer (B) Based on Ethylene/α-Olefin>>

As the copolymer (B) based on ethylene/α-olefin to be incorporated according to the present invention, every known copolymer based on ethylene/α-olefin may be employed, wherein those having a Mooney viscosity $ML_{1+4}$ (100° C.) in the range from 90 to 250, preferably in the range from 100 to 200, more preferably in the range from 110 to 180 are preferred. If the Mooney viscosity is in the above preferable range, a thermoplastic elastomer based on olefin according to the present invention which is superior in the balance between the material properties for a thermoplastic elastomer and which is especially superior in the value of permanent compressive strain can be obtained. If the Mooney viscosity is in the above-mentioned more preferable range, a thermoplastic elastomer based on olefin according to the present invention which is more superior in the balance between the material properties and which is especially more superior in the value of permanent compressive strain can be obtained.

The copolymer (B) based on ethylene/α-olefin to be incorporated according to the present invention may favorably have an ethylene content in the range from 70 to 95 mole %, preferably in the range from 70 to 90 mole %, more preferably in the range from 75 to 90 mole %, especially preferably in the range from 75 to 85 mole %. If the ethylene content is in the above-mentioned preferable range, a thermoplastic elastomer based on olefin according to the present invention which is superior in the balance between the material properties for a thermoplastic elastomer and which is especially superior in the value of permanent compressive strain can be obtained. If the ethylene content is in the above-mentioned more preferable range, a thermoplastic elastomer based on olefin according to the present invention which is more superior in the balance between the material properties and which is especially more superior in the value of permanent compressive strain can be obtained.

The copolymer (B) based on ethylene/α-olefin may either be a copolymer of ethylene with an α-olefin having 3–20 carbon atoms, preferably 3–8 carbon atoms, or a copolymer of ethylene, the α-olefin as given above and other comonomer(s). Such other comonomer may include, in particular, a non-conjugated polyene. The copolymer (B) based on ethylene/α-olefin may either be a random copolymer or a block copolymer.

Concrete examples of the copolymer (B) based on ethylene/α-olefin include ethylene/α-olefin copolymers and ethylene/α-olefin/non-conjugated polyene copolymers. Among them, ethylene/α-olefin/non-conjugated polyene copolymers are preferred.

As the α-olefin to be copolymerized with ethylene in the copolymer (B), there may be enumerated, for example, propylene, 1-butene, pentene, 4-methyl-1-pentene, 1-hexene and 1-octene. The α-olefin may either be incorporated alone or in a combination of two or more.

As the non-conjugated polyene to be incorporated in the copolymer (B) based on ethylene/α-olefin, there may be enumerated, for example, dicyclopentadiene, 1,4-hexadiene, cyclooctadiene, methylenenorbornene and ethylidenenorbornene. The non-conjugated polyene may either be incorporated alone or in a combination of two or more. The ethylene/α-olefin/non-conjugated polyene copolymer may favorably have an iodine value usually in the range from 0.1 to 50, preferably in the range from 5 to 30.

The copolymer (B) based on ethylene/α-olefin may either be incorporated alone or in a combination of two or more in the thermoplastic elastomer according to the present invention.

The copolymer (B) based on ethylene/α-olefin can be produced by a known technique using a known catalyst, such as metallocene catalyst or a vanadium catalyst. For example, an ethylene/α-olefin/non-conjugated polyene copolymer can be produced by the technique described in the book "Polymer Seizo Process (polymer production process)", issued from K. K. Kogyo Chosakai, on pages 309–330.

<<The Thermoplastic Elastomer Based on Olefin>>

The thermoplastic elastomer based on olefin according to the present invention (referred to hereinafter as "the thermoplastic olefinic elastomer") has the following characteristics ①  to ③ , namely, $$9 \leq Y - 0.43 X \leq 27 \tag{1}$$

preferably $$9 \leq Y - 0.43 X \leq 26 \tag{1'}$$

more preferably $$10 \leq Y - 0.43 X \leq 26 \tag{1''}$$

① in which X denotes the JIS A-hardness value (a dimensionless value) of the thermoplastic olefinic elastomer, determined according to the prescription of JIS K 6301 and Y represents the permanent compressive strain value (expressed by %) of the thermoplastic olefinic elastomer, determined according to the prescription of JIS K 6301 under a condition of 70° C.×22 hours, ② a tensile strength in the range from 5 to 30 MPa, preferably from 8 to 30 MPa, more preferably from 12 to 30 MPa, determined according to the prescription of JIS K 6301, and ③ a permanent elongation value of 18% or less, preferably in the range from 0.5 to 15%, more preferably in the range from 0.5 to 12%, determined according to the prescription of JIS K 6301.

The concrete methods for the determinations of the above characteristics ① to ③ are as follows:

○The JIS A hardness value:

Determined according to the prescription of JIS K 6301 as an instantaneous value using a Type A Hardness Tester operated with a spring.

○The permanent compressive strain value:

Determined according to the prescription of JIS K 6301 as the residual strain using a stubby cylindrical test specimen having a diameter of 29.0 mm and a thickness of 12.7 mm after the specimen has been held pressed for 22 hours under a condition of 25% compression×70° C.

○The tensile strength:

Determined according to the prescription of JIS K 6301 using a JIS No. 3 dumbbell specimen at a drawing velocity of 200 mm/min.

○The permanent elongation value:

Determined according to the prescription of JIS K 6301 as the residual elongation using a JIS No. 3 dumbbell specimen after the specimen has been maintained under 100% elongation for 10 minutes and, then, kept for 10 minutes with relieved tension before the determination of the residual elongation.

The thermoplastic olefinic elastomer according to the present invention comprises the polyethylene resin (A) and the copolymer (B) based on ethylene/α-olefin and should favorably have the characteristic features ① to ③ as described previously. As the copolymer (B) based on ethylene/α-olefin, one which has a Mooney viscosity and the ethylene content each in the range given previously is preferred. The proportion of the polyethylene resin (A) and that of the copolymer (B) based on ethylene/α-olefin may favorably be in the range from 5 to 60%, preferably in the range from 10 to 50%, for the former, and may favorably be in the range from 40 to 95%, preferably in the range from 50 to 90%, for the latter, based on the total weight of the polyethylene resin (A) plus the copolymer (B) based on ethylene/α-olefin.

The thermoplastic olefinic elastomer according to the present invention may favorably be obtained from the elastomer composition comprising the polyethylene resin (A) and the copolymer (B) based on ethylene/α-olefin mentioned above by subjecting the elastomer composition to a dynamic heat treatment in the absence of cross linking agent, wherein special preference is given to one which is obtained from the elastomer composition mentioned above by subjecting it to a dynamic heat treatment on a double screw extruder under a condition satisfying the following provision ④ , namely, $$4.8 < \{(T-130)/100\} + 2.2 \log P + \log Q - \log R < 7.0 \tag{2}$$

preferably $$5.0 < \{(T-130)/100\} + 2.2 \log P + \log Q - \log R < 6.8 \tag{2'}$$

more preferably $$5.3 < \{(T-130)/100\} + 2.2 \log P + \log Q - \log R < 6.5 \tag{2''}$$

④ in which T represents the temperature (° C.) of the resin mixture at the die outlet, P is the screw diameter (mm) of the double screw extruder, Q is the maximum shearing velocity (sec$^{-1}$) at which the resin mixture is kneaded in the double screw extruder and is defined by the formula Q=P×π×S/U with P being as above, S being the number of revolutions per second (r.p.s) of the screw and U being the gap (mm) between the inner face of the barrel wall and the kneading segment of the screw at the narrowest portion thereof and R is the extrusion through-put (kg/hr) of the double screw extruder.

The thermoplastic olefinic elastomer according to the present inevention obtained by the dynamic heat treatment on a double screw extruder in the absence of cross linking agent under the condition satisfying the provision ④ given above is superior in the tensile strength, in the permanent elongation value, in the permanent compressive strain value and in the appearance of the formed product made thereof.

<<The Composition of Thermoplastic Elastomer Based on Olefin>>

The composition of thermoplastic elastomer based on olefin (denoted hereinafter as "the thermoplastic olefinic elastomer composition") according to the present invention to be served as the starting material for producing the thermoplastic olefinic elastomer described above comprises the polyethylene resin (A) and the copolymer (B) based on ethylene/α-olefin each in a proportion in the range from 5 to 60%, preferably from 10 to 50%, for the former, and from 40 to 95%, preferably from 50 to 90%, for the latter, based on the total weight of the polyethylene resin (A) plus the copolymer (B) based on ethylene/α-olefin.

The thermoplastic olefinic elastomer composition according to the present invention may favorably be a composition obtained by subjecting a mixture composed of 5–60% by weight, preferably 10–50% by weight, of the polyethylene resin (A) and 40–95% by weight, preferably 50–90% by weight, of the copolymer (B) based on ethylene/α-olefin to a dynamic heat treatment in the absence of cross linking agent.

The thermoplastic olefinic elastomer and the thermoplastic olefinic elastomer composition according to the present invention can afford to provide a formed product which is superior in the balance between the material properties as a thermoplastic elastomer and exhibits a particularly superior value of permanent compressive strain, so long as the contents of the polyethylene resin (A) and of the copolymer (B) based on ethylene/α-olefin are in the above-mentioned preferable range. It can afford to provide furthermore a formed product which is more superior in the balance between the material properties as a thermoplastic elastomer and exhibits particularly a more superior value of permanent compressive strain, so long as the contents of the polyethylene resin (A) and of the copolymer (B) based on ethylene/α-olefin are in the above-mentioned more preferable range.

The thermoplastic olefinic elastomer and the thermoplastic olefinic elastomer composition according to the present invention may comprise a polypropylene resin (C). As the polypropylene resin (C), every known polypropylene resin can be incorporated without any restriction. Concrete examples therefor include those given below:

1) Homopolymers of propylene.
2) Random copolymers of propylene and other α-olefin(s), i.e. propylene/α-olefin random copolymers, in molar proportions in the range of 90 mole % or higher for the former and less than 10 mole % for the latter.
3) Block-copolymers of propylene and other α-olefin(s), i.e. propylene/α-olefin block-copolymers, in molar proportions in the range of 70 mole % or higher for the former and less than 30 mole % for the latter.

For the α-olefin to be copolymerized with propylene, there may be exemplified concretely those having 2–20 carbon atoms, preferably 2–8 carbon atoms, such as ethylene, 1-butene, 4-methyl-1-pentene, 1-hexene and 1-octene.

As the polypropylene resin (C), there may favorably be employed homopolymers of propylene of above 1) and propylene/α-olefin random copolymers of above 2), wherein special preference is given to those which have MFR values (ASTM D 1238, 230° C., 2.16 kg load) in the range from 0.1 to 50 g/10 min.

The polypropylene resin (C) may either be a single polymer product or a blend of polymer products.

The content of the polypropylene resin (C) in the thermoplastic olefinic elastomer or in the thermoplastic olefinic elastomer composition according to the present invention may favorably be in the range of 30 parts by weight or less, preferably in the range from 2 to 30 parts by weight, more preferably in the range from 5 to 20 parts by weight, per 100 parts by weight of the total sum of the polyethylene resin (A) plus the copolymer (B) based on ethylene/α-olefin.

If the content of the polypropylene resin (C) is in the above range, a formed product exhibiting superior appearance with scarce occurrence of rough or sticky surface can be produced by, for example, extrusion molding and injection molding.

The thermoplastic olefinic elastomer and the thermoplastic olefinic elastomer composition according to the present invention may, on requirement, contain additives and other ingredients known per se, such as softening agent, heat stabilizer, antioxidant, anti-weathering stabilizer, antistatic agent, fillers, colorants and lubricant, within the extent not obstructing the purpose of the invention.

For the softening agent, there may be employed favorably those based on mineral oil. Such mineral oil base softening agents may favorably include those based on paraffin, naphthene and aromatics which are employed commonly in rubber industry.

<<Production of the Thermoplastic Olefinic Elastomer Composition>>

The thermoplastic olefinic elastomer composition according to the present inention can be produced either by simply blending the polyethylene resin (A) and the copolymer (B) based on ethylene/α-olefin optionally together with other additives and ingredients to be incorporated on requirement preferably in the proportion as given previously or by blending them under a dynamic heat treatment in the absence of cross linking agent.

<<Production of the Thermoplastic Olefinic Elastomer>>

The thermoplastic olefinic elastomer according to the present invention can be produced by subjecting the above-mentioned thermoplastic olefinic elastomer composition comprising the polyethylene resin (A) and the copolymer (B) based on ethylene/α-olefin with optionally incorporated additives and other ingredients to a dynamic heat treatment in the absence of cross linking agent and forming the resulting heat treated mass into a formed product of contemplated geometry. When the starting thermoplastic olefinic elastomer composition is present as a mass which has already been subjected to the dynamic heat treatment in the absence of cross linking agent, the thermoplastic olefinic elastomer according to the present invention can be obtained simply by forming such elastomer composition into a contemplated shape.

Here, the word "dynamic heat treatment" means a technical measure, in which the thermoplastic olefinic elastomer composition comprising the polyethylene resin (A), the copolymer (B) based on ethylene/α-olefin and optionally incorporated additives and other ingredients is melt-kneaded, namely, kneaded in a molten state. The dynamic heat treatment may preferably be performed in the absence of organic solvent, such as hydrocarbon. Here, however, incorporation of a softening agent mentioned above may be permitted.

The dynamic heat treatment can be realized on a kneading apparatus, for example, a mixing roller, an intensive mixer, such as a Bumbury's mixer or kneader, a kneading machine, such as single screw extruder or a double screw extruder, wherein it is preferable to employ a double screw extruder, in particular, so as to effect the dynamic heat treatment under a condition satisfying the provision defined by the mathematical formula (2) given above. By subjecting the elastomer composition on a double screw extruder to a dynamic heat treatment under the condition satisfying the provision defined by the formula (2) before being formed into a formed product, the resulting formed elastomer product becomes superior in the compatibility of all the constituent ingredients of the elastomer, in the tensile strength, in the permanent elongation value, in the permanent compressive strain value and in the appearance. The dynamic heat treatment may favorably be realized in a kneading apparatus of closed type in, preferably, an inert atmosphere, such as nitrogen gas.

The dynamic heat treatment may favorably be effected at a kneading temperature usually in the range from 150 to 280° C., preferably from 170 to 240° C., for a duration in the range from 1 to 20 minutes, preferably from 1 to 5 minutes. Usually, the shearing force appearing upon the keading of the elastomer composition may favorably be in the range from 10 to 104 $\sec^{-1}$, preferably in the range from 102 to 104 $\sec^{-1}$, in terms of the shearing velocity. By subjecting the elastomer composition to a dynamic heat treatment in this manner in the absence of cross linking agent, the resulting formed product of the thermoplastic olefinic elastomer will reveal the characteristic features ① to ③ given above.

In the so-obtained thermoplastic olefinic elastomer according to the present invention, the polyethylene resin (A) and the copolymer (B) based on ethylene/α-olefin are present in a lamellated structure, in which such lamellae may favorably have side lengths not greater than 2 μm, preferably in the range from 0.5 to 1.8 μm. When the lengths of the peripheral sides of these lamellae are in the above range, the resulting thermoplastic olefinic elastomer will reveal a better compatibility of the polyethylene resin (A) with the copolymer (B) based on ethylene/α-olefin and will be superior in the tensile strength and in the permanent compressive strain value.

The thermoplastic olefinic elastomer according to the present invention exhibits a better rubbery elasticity without being vulcanized using a vulcanizing agent or cross linking agent and using a cross linking assistant. The thermoplastic olefinic elastomer according to the present invention is not an elastomer of thermosetting type resulting from vulcanization or cross linking as in a conventional vulcanized rubber but is an elastomer of thermoplastic type, so that it can easily be put to recycled use. There is no need for a vulcanizing agent nor for a solvent, so that no process step of kneading with a cross linking agent nor a process step of removal of solvent is required and it can be obtained simply and efficiently in an economical way by only a single step of dynamic heat treatment. In addition, it is obtained from a principal starting material of olefin and does not have any chlorine content, so that no noxious gas is evolved upon incineration thereof.

By the process for producing the thermoplastic olefinic elastomer according to the present invention, a thermoplastic olefinic elastomer exhibiting superior rubbery elasticity can be produced simply in a single process step efficiently by kneading the polyethylene resin (A), the copolymer (B) based on ethylene/β-olefin optionally together with other resin(s) and additives to be incorporated on requirement under a dynamic heat treatment without using any cross linking agent, such as an organic peroxide or the like, or any vulcanization assistant, such as a divinyl compound, as in the production of conventional vulcanized rubber. It can be produced at a low cost, since no cross linking agent nor vulcanization assistant is required and the laborious vulcanization step is dispensed with.

The thermoplastic olefinic elastomer according to the present invention obtained in this manner can favorably be utilized in the application fields of interior and exterior parts in automobile, parts and instruments for household electric appliances, parts and elements for constructional and architectural uses, miscellaneous goods and articles for daily use.

In conclusion, the thermoplastic olefinic elastomer according to the present invention is superior in the rubbery elasticity due to its intrinsic property. It can be produced in a simple manner at a low cost by one single process step without employing cross linking agent and, in addition, permits recycled use easily after it has been brought into waste.

The thermoplastic olefinic elastomer composition according to the present invention can be produced in a simple manner at a low cost in one single process step by subjecting a specific proportion of the polyethylene resin (A) together with a special proportion of the copolymer (B) based on ethylene/α-olefin to a dynamic heat treatment in the absence of cross linking agent. It is superior in the rubbery elasticity and permits its recycled use easily. From such thermoplastic olefinic elastomer composition, the thermoplastic olefinic elastomer according to the present invention can easily be obtained.

The method for producing the thermoplastic olefinic elastomer composition according to the present invention comprises subjecting a specific proportion of the polyethylene resin (A) together with a special proportion of the copolymer (B) based on ethylene/α-olefin to a dynamic heat treatment in the absence of cross linking agent, so that the said composition which is superior in the rubbery elasticity and permits to be recycled easily for reclamation thereof can be obtained in a simple and an economical manner in one single process step.

The process for producing the thermoplastic olefinic elastomer according to the present invention comprises subjecting the polyethylene resin (A) together with the copolymer (B) based on ethylene/α-olefin to a dynamic heat treatment in the absence of cross linking agent and the process can afford to obtain a thermoplastic elastomer having specified properties with superior rubbery elasticity and capability of easy recycled use, in a simple, efficient and economical way in a single process step.

THE BEST MODE FOR EMBODYING THE INVENTION

Below, the present invention will further be described in more detail by way of Examples and Comparative Examples, wherein it is to be noted that such Examples should not be regarded as restricting the invention in any respect.

The starting materials, such as the polyethylene resin (A), the copolymer (B) based on ethylene/α-olefin and the polypropylene resin (C), used in Examples and Comparative Examples for producing the thermoplastic olefinic elastomers are given below:

In Examples and Comparative Examples, the values given for the melt flow rate (MFR) of the starting materials refer to those determined according to ASTM D 1238 at 190° C. under a load of 2.16 kg, so long as not specifically mentioned.

The $g_n$*value defined by the formula (3)

$$g_n = [\eta]/[\eta]_{blank} \quad (3)$$

is calculated from the observed intrinsic viscosity $[\eta]$ of each copolymer. (B) determined in decalin at 135° C. In the above formula (3), $[\eta]$ denotes the intrinsic viscosity of the copolymer (B) based on ethylene/α-olefin, determined in decalin at 135° C., and $[\eta]_{blank}$ denotes the intrinsic viscosity value, determined in decalin at 135° C., of an ethylene/propylene random linear copolymer having an ethylene content of 70 mole % and a weight-average molecular weight (determined by the light scattering method) which is identical with that of the copolymer (B) for which the intrinsic viscosity $[\eta]$ has been determined {See Japanese Patent Kokai Sho-58-191705 A (Japanese Patent Publication Hei-3-14045 B)}. If this $g_n$*value exceeds above 0.95, the copolymer (B) should be judged as existing in a linear chain and, if this value is in the range of 0.2–0.95, the copolymer (B) should be judged as being present in a form of a branched long chain.

On the other hand, a value B defined by the formula (4)

$$B = P_{OE}/(2P_O \cdot P_E) \quad (4)$$

is calculated by $^{13}$C-NMR technique, which is a parameter indicating the degree of randomness of the distribution of a comonomer chain in the copolymer and indicates the state of compositional distribution of structural units in the copolymer chain. In the formula (4), $P_E$ and $P_O$ represent each the mole fraction of ethylene and of the α-olefin in the copolymer (B) based on ethylene/α-olefin and $P_{OE}$ denotes the proportion of the alternating chain of ethylene/α-olefin relative to the total number of dyad chains in the copolymer (B).

Concrete procedures for determining these values for $P_E$, $P_O$ and $P_{OE}$ were as follows. Thus, about 200 mg of the copolymer (B) based on ethylene/α-olefin were dissolved in 1 ml of hexachlorobutadiene in a test tube of 10 mm ø homogeneously to prepare the sample solution. A $^{13}$C-NMR spectrum of this sample was detected in the following condition:

Observation temperature: 120° C.
Observation frequency : 20.05 MHz
Spectral line width : 1500 Hz
Filter width : 1500 Hz
Pulse recurrence time : 4.2 sec.
Pulse width : 7 μsec.
Number of repetition
of integration : 2000 to 5000

The values for $P_E$, $P_O$ and $P_{OE}$ can be determined from the observed $^{13}$C-NMR spectrum by the method reported by G. J. Ray: "Macromolecules", 10, 733 (1977), J. C. Randall: "Macromolecules", 15, 353 (1982) and K. Kimura: "Polymer", 25, 4418 (1984). The B-value calculated by the formula (4) will stand for 2 when the two comonomers are distributed in the copolymer (B) in a completely alternating repetition and will stand for zero when the two comonomers are present in completely separated blocks in the copolymer (B).

The glass transition temperature Tg was determined using a differential scanning calorimeter (DSC). The D value was calculated from the $^{13}$C-NMR spectrum of the copolymer (B) based on ethylene/α-olefin. The D value is a ratio of the intensities (surface areas) of the Tαβ relative to the Tαα in the $^{13}$C-NMR spectrum of the copolymer (B) based on ethylene/α-olefin, namely, (Tαβ)/(Tαα). The D value may be different for each copolymer in accordance with each specific α-olefin in the copolymer (B). The Tαβ and the Tαα represent each a peak strength for the structural unit $CH_2$ derived from each α-olefin as shown in the following structural formulae, in which two different $CH_2$ groups distinguished by the position relative to the tertiary carbon atom are shown.

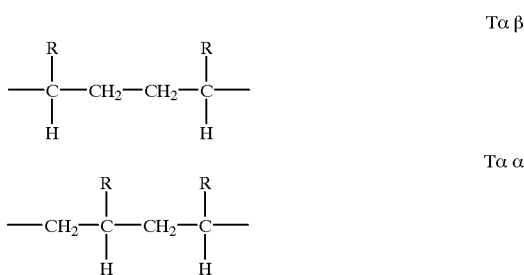

In the above formulae, R indicates the radical of the α-olefin.

The D-value for the copolymer (B) based on ethylene/α-olefin was determined concretely in the following manner. Thus, the $^{13}$C-NMR spectrum was detected by an NMR spectrometer JEOL-GX270 of JEOL Ltd. using a solution of the copolymer (B) of a concentration of 5% by weight in a mixed solvent of hexachloro-butadiene/$d_6$-benzene of 2/1 volume ratio at a frequency of 67.8 MHz at 25° C. based on $d_6$-benzene standard (128 ppm). The analysis of the $^{13}$C-NMR stectrum was carried out basically in accordance with the proposal of Lindemann/Adams: "Analysis Chemistry", 43, p 1245 (1971), J. C. Randall "Review Macromolecular Chemistry Physics", C29, 201 (1989).

Now, the D-value is explained concretely by way of an example of ethylene/1-butene/7-methyl-1,6-octadiene copolymer rubber. In the $^{13}$C-NMR spectrum of the ethylene/1-butene/7-methyl-1,6-octadiene copolymer rubber, the peak appearing at 39–40 ppm belongs to the Tαα and the peak appearing at 31–32 ppm falls under the Tαβ. The D-value is determined by estimating the ratio between the integrated peak areas (sueface areas). The D-value determined as above is accepted in general as a parameter indicating the proportion of occurrence of 2,1-addition reaction subsequent to the 1,2-addition of 1-butene or the proportion of occurrence of 1,2-addition reaction subsequent to the 2,1-addition of 1-butene. Thus, the greater the D-value, the more random will be the direction of binding of the α-olefin (1-butene) and vice versa. If the D-value is small and the regularity is high, the molecular chains may tend to come gathered and, hence, the resulting copolymer will reveal higher strength and, therefore, such condition is favorable. A copolymer (B) based on ethylene/α-olefin having a D-value not higher than 0.5 can easily be obtained by copolymerization using a metallocene catalyst of Group 4 element, such as titanium or zirconium, while a copolymer (B) based on ethylene/α-olefin having a D-value not greater than 0.5 may difficultly be obtained even using a metallocene catalyst of Group 5 element, such as vanadium. This applies also to other α-olefins than 1-butene.

<<The Polyethylene Resin (A)>>
(A-1) A high density polyethylene:
  Density=0.954 g/cm$^3$
  MFR=0.8 g/10 min.
  (a homopolymer of ethylene)
(A-2) A low density linear polyethylene:
  Density=0.920 g/cm$^3$
  MFR=2.1 g/10 min.
  Ethylene content=97.0 mole %
  4-methyl-1-pentene content=3.0 mole %
(A-3) A low density linear polyethylene:
  Density=0.920 g/cm$^3$
  MFR=18 g/10 min.
  Ethylene content=96.8 mole %
  4-methyl-1-pentene content=3.2 mole %
(A-4) A low density polyethylene:
  Density=0.927 g/cm$^3$
  MFR=3 g/10 min.
  (a homopolymer of ethylene)
(A-5) A low density linear polyethylene:
  Density=0.915 g/cm$^3$
  MFR=2 g/10 min.
  Ethylene content=97.0 mole %
  4-methyl-1-pentene content=3.0 mole %
  (a low density linear polyethylene polymerized using a metallocene catalyst)
(A-6) A low density polyethylene:
  Density=0.915 g/cms
  MFR=2.3 g/10 min.
  Ethylene content=95.8 mole %
  1-butene content=4.2 mole %
  (a low density polyethylene polymerized using a metallocene catalyst)
<<The Copolymer (B) Based on Ethylene/α-Olefin>>
(B-1) An ethylene/propylene/dicyclopentadiene co-polymer rubber:
  Ethylene content=77 mole %
  Mooney viscosity [$ML_{1+4}$, 100° C.]=145
  Iodine value=12
(B-2) An ethylene/propylene/5-ethylidene-2-norbornene copolymer rubber:
  Ethylene content=78 mole %
  Mooney viscosity [$ML_{1+4}$, 100° C.]=150
  Iodine value=13
(B-3) An ethylene/propylene/5-ethylidene-2-norbornene copolymer rubber:
  Ethylene content=78 mole %
  Mooney viscosity [$ML_{1+4}$, 100° C.]=110
  Iodine value=13
(B-4) An ethylene/propylene/5-ethylidene-2-norbornene copolymer rubber:
  Ethylene content=85 mole %
  Mooney viscosity [$ML_{1+4}$, 100° C.]=150
  Iodine value=13
(B-5) An ethylene/propylene/5-ethylidene-2-norbornene copolymer rubber:
  Ethylene content=82 mole %
  Mooney viscosity [$ML_{1+4}$, 100° C.]=15
  Iodine value=10
(B-6) An ethylene/propylene/5-ethylidene-2-norbornene copolymer rubber:
  Ethylene content=68 mole %
  Mooney viscosity [$ML_{1+4}$, 100° C.]=69
  Iodine value=13
(B-7) An ethylene/propylene/5-ethylidene-2-norbornene copolymer rubber:
  Ethylene content=68 mole %
  Mooney viscosity [$ML_{1+4}$, 100° C.]=100
  Iodine value=12
(B-8) An ethylene/l-butene/5-ethylidene-2-norbornene copolymer rubber:
  Ethylene content=79 mole %
  Mooney viscosity [$ML_{1+4}$, 100° C.]=100
  Iodine value=10
  (an ethylene/1-butene/ENB linear copolymer rubber co-polymerized using a metallocene catalyst)
  $g_n^*$=0.98
  B-value=1.1
  Glass transition temp. Tg=−56° C.
  D-value<0.01
(B-9) An ethylene/1-butene/5-ethylidene-2-norbornene copolymer rubber:
  Ethylene content=79 mole %
  Mooney viscosity [$ML_{1+4}$, 100° C.]=95
  Iodine value=13
  (an ethylene/1-butene/ENB branched long chain copolymer rubber co-polymerized using a metallocene catalyst)
  $g_n^*$=0.67
  B-value=1.1
  Glass transition temp. Tg=−56° C.
  D-value<0.01
(B-10) A blend of 70 parts by weight of the (B-1) ethylene/propylene/dicyclopentadiene copolymer rubber and 40 parts by weight of an extender oil (a paraffinic oil PW-380 (trademark) of Idemitsu Kosan Co., Ltd.)
<<The Polypropylene Resin (C)>>
(C-1) A propylene/ethylene random copolymer:
  Ethylene content=4 mole %
  MFR (ASTM D 1238, 230° C., 2.16 kg load)=0.5 g/10 min.
(C-2) A homopolymer of propylene:
  MFR (ASTM D 1238, 230° C., 2.16 kg load)=1.5 g/10 min.
(C-3) A homopolymer of propylene:
  Density=0.91 g/cm$^3$
  MFR (ASTM D 1238, 230° C., 2.16 kg load)=1.4 g/10 min.
<<Mineral Oil Softening Agent>>
  A paraffinic oil PW-380 (trademark) of Idemitsu Kosan Co., Ltd.

EAMPLES 1 to 18

The blending components given in Tables 1 to 3 were blended on a Henschel mixer each in a proportion given in Tables 1 to 3. The resulting blend was then extruded by a double screw extruder having a screw diameter of 50 mm with L/D=30 under a nitrogen atmosphere at 220° C. under a dynamic heat treatment to obtain pelletized product of a composition of thermoplastic olefinic elastomer. This pelletized composition of thermoplastic olefinic elastomer was processed by injection molding on an injection molding machine into a formed product of the thermoplastic olefinic elastomer, i.e. a test specimen for testing material properties, in order to test for the hardness (JIS A hardness), permanent compressive strain (CS) and tensile strength. This specimen was also tested for the permanent elongation value. The results are given in Tables 1 to 3.

COMPARATIVE EXAMPLES 1 to 7

The same procedures as in Examples were repeated except that the blending components and their proportions were changed as given in Tables 4 and 5. The results are given in Tables 4 and 5.

TABLE 1

Blending proportion of components and test results

| Component (in parts by weight) | | Example | | | | | |
|---|---|---|---|---|---|---|---|
| | | 1 | 2 | 3 | 4 | 5 | 6 |
| A-1 | | 30 | – | – | – | – | – |
| A-2 | | – | 30 | – | – | 30 | 10 |
| A-3 | | – | – | 30 | – | – | – |
| A-4 | | – | – | – | 30 | – | – |
| A-5 | | – | – | – | – | – | – |
| A-6 | | – | – | – | – | – | – |
| B-1 | | 70 | 70 | 70 | 70 | 70 | 90 |
| B-2 | | – | – | – | – | – | – |
| B-3 | | – | – | – | – | – | – |
| B-4 | | – | – | – | – | – | – |
| B-5 | | – | – | – | – | – | – |
| B-6 | | – | – | – | – | – | – |
| B-7 | | – | – | – | – | – | – |
| B-8 | | – | – | – | – | – | – |
| B-9 | | – | – | – | – | – | – |
| B-10 | | – | – | – | – | – | – |
| C-1 | | – | – | – | – | – | – |
| C-2 | | – | – | – | – | – | – |
| C-3 | | – | – | – | – | – | – |
| Paraffinic oil | | – | – | – | – | 40 | – |
| Test result | | | | | | | |
| JIS A hardness | *1 | 81 | 74 | 74 | 76 | 70 | 62 |
| Perm. C. S. (%) | *2 | 49 | 46 | 55 | 51 | 46 | 43 |
| Tens. Str. (MPa) | *3 | 12 | 18 | 15 | 14 | 14 | 10 |
| Perm. elong. (%) | *4 | 18 | 10 | 10 | 11 | 9 | 9 |
| Occurrence of rough surface | *5 | x | ○ | Δ | Δ | ○ | Δ |
| Value according to formula (1) | *6 | 14.2 | 14.2 | 23.2 | 18.3 | 15.9 | 16.3 |
| T | *7 | 230 | 223 | 222 | 223 | 222 | 235 |
| P | *8 | 50 | 50 | 50 | 50 | 50 | 50 |
| Q | *9 | 2800 | 2800 | 2800 | 2800 | 2800 | 2800 |
| R | *10 | 50 | 50 | 50 | 50 | 50 | 50 |
| Value accord. to formula (2) | *11 | 6.49 | 6.42 | 6.41 | 6.42 | 6.41 | 6.54 |

TABLE 2

Blending proportion of components and test results

| Component (in parts by weight) | Example | | | | | |
|---|---|---|---|---|---|---|
| | 7 | 8 | 9 | 10 | 11 | 12 |
| A-1 | – | – | – | – | – | – |
| A-2 | 50 | 30 | 30 | 30 | – | 15 |
| A-3 | – | – | – | – | – | – |
| A-4 | – | – | – | – | – | – |
| A-5 | – | – | – | – | 30 | – |
| A-6 | – | – | – | – | – | – |
| B-1 | 50 | – | – | – | 70 | 85 |
| B-2 | – | 70 | – | – | – | – |
| B-3 | – | – | 70 | – | – | – |
| B-4 | – | – | – | 70 | – | – |
| B-5 | – | – | – | – | – | – |
| B-6 | – | – | – | – | – | – |
| B-7 | – | – | – | – | – | – |
| B-8 | – | – | – | – | – | – |
| B-9 | – | – | – | – | – | – |
| B-10 | – | – | – | – | – | – |
| C-1 | – | – | – | – | – | 10 |
| C-2 | – | – | – | – | – | – |
| C-3 | – | – | – | – | – | – |

TABLE 2-continued

Blending proportion of components and test results

| Component (in parts by weight) | | Example | | | | | |
|---|---|---|---|---|---|---|---|
| | | 7 | 8 | 9 | 10 | 11 | 12 |
| Paraffinic oil | | – | – | – | – | – | – |
| Test result | | | | | | | |
| JIS A hardness | *1 | 88 | 74 | 74 | 80 | 79 | 66 |
| Perm. C. S. (%) | *2 | 58 | 52 | 51 | 46 | 43 | 50 |
| Tens. Str. (MPa) | *3 | 29 | 20 | 22 | 22 | 23 | 12 |
| Perm. elong. (%) | *4 | 16 | 11 | 12 | 10 | 7 | 6 |
| Occurrence of rough surface | *5 | ⊙ | ○ | ○ | ○ | ⊙ | ⊙ |
| Value according to formula (1) | *6 | 20.2 | 20.2 | 19.2 | 11.6 | 9.03 | 21.6 |
| T | *7 | 232 | 225 | 222 | 222 | 230 | 235 |
| P | *8 | 50 | 50 | 50 | 50 | 50 | 50 |
| Q | *9 | 2800 | 2800 | 2800 | 2800 | 2800 | 2800 |
| R | *10 | 50 | 50 | 50 | 50 | 50 | 50 |
| Value accord. to formula (2) | *11 | 6.51 | 6.44 | 6.41 | 6.41 | 6.49 | 6.54 |

TABLE 3

Blending proportion of components and test results

| Component (in parts by weight) | | Example | | | | | |
|---|---|---|---|---|---|---|---|
| | | 13 | 14 | 15 | 16 | 17 | 18 |
| A-1 | | – | – | – | – | – | – |
| A-2 | | 15 | 15 | – | 30 | 30 | 30 |
| A-3 | | – | – | – | – | – | – |
| A-4 | | – | – | – | – | – | – |
| A-5 | | – | – | – | – | – | – |
| A-6 | | – | – | 30 | – | – | – |
| B-1 | | 85 | 85 | 70 | – | – | – |
| B-2 | | – | – | – | – | – | – |
| B-3 | | – | – | – | – | – | – |
| B-4 | | – | – | – | – | – | – |
| B-5 | | – | – | – | – | – | – |
| B-6 | | – | – | – | – | – | – |
| B-7 | | – | – | – | – | – | – |
| B-8 | | – | – | – | 70 | – | – |
| B-9 | | – | – | – | – | 70 | – |
| B-10 | | – | – | – | – | – | 110 |
| C-1 | | 20 | – | – | – | – | – |
| C-2 | | – | 20 | – | – | – | – |
| C-3 | | – | – | – | – | – | – |
| Paraffinic oil | | – | – | – | – | – | – |
| Test result | | | | | | | |
| JIS A hardness | *1 | 75 | 77 | 78 | 74 | 72 | 70 |
| Perm. C. S. (%) | *2 | 55 | 57 | 43 | 40 | 40 | 43 |
| Tens. Str. (MPa) | *3 | 13 | 13 | 22 | 28 | 20 | 13 |
| Perm. elong. (%) | *4 | 7 | 11 | 8 | 12 | 11 | 7 |
| Occurrence of rough surface | *5 | ⊙ | ⊙ | ⊙ | ○ | ○ | ○ |
| Value according to formula (1) | *6 | 22.8 | 23.9 | 9.46 | 8.18 | 9.04 | 12.9 |
| T | *7 | 239 | 238 | 222 | 229 | 228 | 255 |
| P | *8 | 50 | 50 | 50 | 50 | 50 | 50 |
| Q | *9 | 2800 | 2800 | 2800 | 2800 | 2800 | 2800 |
| R | *10 | 50 | 50 | 50 | 50 | 50 | 50 |
| Value accord. to formula (2) | *11 | 6.58 | 6.57 | 6.41 | 6.48 | 6.47 | 6.44 |

TABLE 4

Blending proportion of components and test results

| Component (in parts by weight) | Comparative Example | | | | |
|---|---|---|---|---|---|
| | 1 | 2 | 3 | 4 | 5 |
| A-1 | – | – | – | – | – |
| A-2 | 30 | 30 | 30 | 70 | – |
| A-3 | – | – | – | – | – |
| A-4 | – | – | – | – | – |

TABLE 4-continued

Blending proportion of components and test results

| Component (in parts by weight) | | Comparative Example | | | | |
|---|---|---|---|---|---|---|
| | | 1 | 2 | 3 | 4 | 5 |
| A-5 | | – | – | – | – | – |
| A-6 | | – | – | – | – | – |
| B-1 | | – | – | – | 30 | 70 |
| B-2 | | – | – | – | – | – |
| B-3 | | – | – | – | – | – |
| B-4 | | – | – | – | – | – |
| B-5 | | 70 | – | – | – | – |
| B-6 | | – | 70 | – | – | – |
| B-7 | | – | – | 70 | – | – |
| B-8 | | – | – | – | – | – |
| B-9 | | – | – | – | – | – |
| B-10 | | – | – | – | – | – |
| C-1 | | – | – | – | – | – |
| C-2 | | – | – | – | – | – |
| C-3 | | – | – | – | – | 30 |
| Paraffinic oil | | – | – | – | – | – |
| Test result | | | | | | |
| JIS A hardness | *1 | 84 | 68 | 70 | 91 | 91 |
| Perm. C. S. (%) | *2 | 66 | 72 | 65 | 69 | 87 |
| Tens. Str. (MPa) | *3 | 11 | 2 | 2 | 35 | 4 |
| Perm. elong. (%) | *4 | 19 | 20 | 19 | 29 | 32 |
| Occurrence of rough surface | *5 | ○ | ○ | ○ | ◉ | ◉ |
| Value according to formula (1) | *6 | 29.9 | 42.8 | 34.9 | 29.9 | 47.9 |
| T | *7 | 222 | 225 | 224 | 230 | 235 |
| P | *8 | 50 | 50 | 50 | 50 | 50 |
| Q | *9 | 2800 | 2800 | 2800 | 2800 | 2800 |
| R | | 10 | 50 | 50 | 50 | 50 | 50 |
| Value accord. to formula (2) | *11 | 6.41 | 6.44 | 6.43 | 6.49 | 6.54 |

TABLE 5

Blending proportion of components and test results

| Component (in parts by weight) | | Comp. Example | |
|---|---|---|---|
| | | 6 | 7 |
| A-1 | | – | – |
| A-2 | | 30 | 30 |
| A-3 | | – | – |
| A-4 | | – | – |
| A-5 | | – | – |
| A-6 | | – | – |
| B-1 | | 70 | 70 |
| B-2 | | – | – |
| B-3 | | – | – |
| B-4 | | – | – |
| B-5 | | – | – |
| B-6 | | – | – |
| B-7 | | – | – |
| B-8 | | – | – |
| B-9 | | – | – |
| B-10 | | – | – |
| C-1 | | – | – |
| C-2 | | – | – |
| C-3 | | – | – |
| Paraffinic oil | | – | – |
| Test result | | | |
| JIS A hardness | *1 | 74 | 75 |
| Perm. C. S. (%) | *2 | 62 | 69 |
| Tens. Str. (MPa) | *3 | 4 | 2 |
| Perm. elong. (%) | *4 | 21 | 22 |
| Occurrence of rough surface | *5 | ○ | ○ |
| Value according to formula (1) | *6 | 30.2 | 36.8 |
| T | *7 | 279 | 151 |
| P | *8 | 50 | 50 |
| Q | *9 | 4200 | 1100 |
| R | *10 | 20 | 200 |
| Value accord. to formula (2) | *11 | 7.55 | 4.69 |

Notes for Tables 1 to 5:

*1 JIS A hardness instantaneous value, determined according to JIS K using hardness tester A operated with spring.

*2 Permanent compressive strain value, determined according to JIS K 6301 using a stubby cylindrical test specimen having a diameter of 29.0 mm and a thickness of 12.7 mm, as the residual strain after the specimen has been pressed for 22 hours under a condition of 25% compression×70° C.

*3 Tensile strength, determined according to JIS K 6301 using JIS No. 3 dumbbell test specimen at a drawing velocity of 200 mm/min.

*4 Permanent elongation value, determined according to JIS K 6301 using JIS No. 3 dumbbell test specimen, as the residual elongation after the specimen has been maintained under 100% elongation for 10 minutes and, then, kept for 10 minutes with relieved tension before observation of the residual elongation.

*5 Occurrence of rough surface on the formed product, judged by visual assessment performed on a test specimen of a form of tape prepared from a pelletized composition of thermoplastic olefinic elastomer by an extruder having a screw diameter of 50 mm at 210° C. The assessments were based on the following criteria: ◉: no rough surface, ○: no noticeable rough surface, Δ: undistinguished rough surface, and ×: considerable rough surface.

*6 A value calculated from Y−0.43X (formula 1), wherein X is the JIS A hardness (a dimensionless value) of the thermoplastic olefinic elastomer determined according to JIS K 6301 which is the same as that of above *1 and Y is the permanent compressive strain expressed by % of the thermoplastic olefinic elastomer determined according to JIS K 6301 which is the same as that of above *2.

*7 to *11 relates to formula (2), namely, $$\{(T-130)/100\}+2.2 \log P + \log Q - \log R \quad (2)$$

wherein

T is the resin temperature (° C.) at the die outlet of a double screw extruder,

P is the screw diameter (mm) of the double screw extruder,

Q is the maximum shearing velocity ($sec^{-1}$) calculated from the above formula, at which the resin mixture is kneaded in the double screw extruder and R is the extrusion through-put of the double screw extruder.

What is claimed is:

1. A thermoplastic elastomer based on olefin exhibiting the following characteristics ① to ③:

$$8.18 \leq Y-0.43\,X \leq 27$$

① wherein X denotes a JIS A-hardness value of the thermoplastic elastomer based on olefin determined according to the prescription of JIS K 6301, and Y represents a permanent compressive strain value, of the thermoplastic elastomer based on olefin determined according to the prescription of JIS K 6301 under a condition of 70° C.×22 hours, ② a tensile strength in the range from 5 to 30 MPa determined according to the prescription of JIS K 6301, and ③ a permanent elongation value of 18% or less determined according to the prescription of JIS K 6301.

2. A thermoplastic elastomer based on olefin comprising a polyethylene resin (A) and a copolymer (B) based on ethylene/α-olefin, and exhibiting the following characteristics ① to ③:

$$8.18 \leq Y-0.43\,X \leq 27$$

① wherein X denotes a JIS A-hardness value of the thermoplastic elastomer based on olefin determined according to the prescription of JIS K 6301, and Y represents a permanent compressive strain value, of the thermoplastic elastomer based on olefin determined according to the prescription of JIS K 6301 under a condition of 70° C.×22 hours, ② a tensile strength in the range from 5 to 30 MPa determined according to the prescription of JIS K 6301, and ③ a permanent elongation value of 18% or less determined according to the prescription of JIS K 6301.

3. The thermoplastic elastomer of claim 2, obtained from a mixture composed of 5–60% by weight of a polyethylene resin (A) and 40–95% by weight of a copolymer (B) based on ethylene/α-olefin having a Mooney viscosity $ML_{1+4}$ (100° C.) of 90–250 and an ethylene content of 70–95 mole % by subjecting the mixture to a dynamic heat treatment in the absence of a cross linking agent.

4. The thermoplastic elastomer of claim 2 or 3, obtained by subjecting the polyethylene resin (A) together with the copolymer (B) based on ethylene/α-olefin to a dynamic heat treatment on a double-screw extruder in the absence of cross linking agent under a process condition satisfying the provision ④:

$$4.8 < \{(T-130)/100\} + 2.2\log P + \log Q - \log R < 7.0$$

in which T is the temperature (° C.) of the resin mixture at the die outlet, P is the screw diameter (mm) of the double screw extruder, Q is the maximum shearing velocity ($sec^{-1}$) at which the resin mixture is kneaded in the double screw extruder and is defined by the formula $Q = P \times \pi \times S/U$ with P being as above, S is the number of revolutions per second (r.p.s) of the screw, U is the gap (mm) between the inner face of the barrel wall and the kneading segment of the screw at the narrowest portion thereof, and R is the extrusion through-put (kg/hr) of the double screw extruder.

5. A composition of thermoplastic elastomer based on olefin comprising 5–60% by weight of a polyethylene resin (A) and 40–95% by weight of a copolymer (B) based on ethylene/α-olefin having a Mooney viscosity $ML_{1+4}$ (100° C.) of 90–250 and an ethylene content of 70–95 mole %.

6. A composition of thermoplastic elastomer based on olefin obtained from a mixture composed of 5–60% by weight of a polyethylene resin (A) and 40–95% by weight of a copolymer (B) based on ethylene/α-olefin having Mooney viscosity $ML_{1+4}$ (100° C.) of 90–250 and an ethylene content of 70–95 mole % by subjecting the mixture to a dynamic heat treatment in the absence of a cross linking agent.

7. The composition of claim 5 or 6, wherein the copolymer (B) based on ethylene/α-olefin consists of an ethylene/α-olefin/non-conjugated polyene copolymer.

8. The composition of claim 5 or 6, further comprising 30 parts by weight or less of a polypropylene resin (C) per 100 parts by weight of the total sum of the polyethylene resin (A) plus the copolymer (B) based on ethylene/α-olefin.

9. A process for producing a composition of thermoplastic elastomer based on olefin, comprising:

subjecting a mixture comprising 5–60% by weight of a polyethylene resin (A) and 40–95% by weight of a copolymer (B) based on ethylene/α-olefin having a Mooney viscosity $ML_{1+4}$ (100° C.) of 90–250 and an ethylene content of 70–95 mole % to a dynamic heat treatment in the absence of a cross linking agent.

10. A process for producing a thermoplastic elastomer based on olefin, comprising:

subjecting a composition of thermoplastic elastomer comprising a polyethylene resin (A) and a copolymer (B) based on ethylene/α-olefin to a dynamic heat treatment in the absence of a cross linking agent, wherein the thermoplastic elastomer exhibits the following characteristics ① to ③:

$$8.18 \leq Y-0.43\,X \leq 27$$

① wherein X denotes a JIS A-hardness value of the thermoplastic elastomer based on olefin determined according to the prescription of JIS K 6301, and Y represents a permanent compressive strain value, of the thermoplastic elastomer based on olefin determined according to the prescription of JIS K 6301 under a condition of 70° C.×22 hours, ② a tensile strength in the range from 5 to 30 MPa, and ③ a permanent elongation value of 18% or less determined according to the prescription of JIS K 6301.

11. A process for producing a thermoplastic elastomer composition based on olefin, comprising:

subjecting a mixture comprising 5–60% by weight of the polyethylene resin (A) and 40–95% by weight of the copolymer (B) based on ethylene/α-olefin having a Mooney viscosity $ML_{1+4}$ (100° C.) of 90–250 and an ethylene content of 70–95 mole % to a dynamic heat treatment in the absence of a cross linking agent; and forming the resulting composition into a formed product exhibiting the following characteristics ① to ③:

$$8.18 \leq Y-0.43\,X \leq 27$$

① wherein X denotes a JIS A-hardness value of the thermoplastic elastomer based on olefin determined according to the prescription of JIS K 6301, and Y represents a permanent compressive strain value, of the thermoplastic elastomer based on olefin determined according to the prescription of JIS K 6301 under a condition of 70° C.×22 hours, ②  a tensile strength in the range from 5 to 30 MPa, and ③ a permanent elongation value of 18% or less determined according to the prescription of JIS K 6301.

12. The process of claim 10 or 11, wherein the dynamic heat treatment is realized on a double-screw extruder in the absence of a cross linking agent under a process condition satisfying the provision ④:

$$4.8 < \{(T-130)/100\} + 2.2 \log P + \log Q - \log R < 7.0$$

④ wherein T is the temperature (° C.) of the resin mixture at the die outlet, P is the screw diameter (mm) of the double screw extruder, Q is the maximum shearing velocity ($sec^{-1}$) at which the resin mixture is kneaded in the double screw extruder and is defined by the formula Q=P×n×S/U with P being as above, S is the number of revolutions per second (r.p.s) of the screw, U is the gap (mm) between the inner face of the barrel wall and the kneading segment of the screw at the narrowest portion thereof, and R is the extrusion through-put (kg/hr) of the double screw extruder.

* * * * *

UNITED STATES PATENT AND TRADEMARK OFFICE
CERTIFICATE OF CORRECTION

PATENT NO. : 6,221,963 B1
DATED : April 24, 2001
INVENTOR(S) : Kyoko Kobayashi et al.

It is certified that error appears in the above-identified patent and that said Letters Patent is hereby corrected as shown below:

Title page,
Under the ABSTRACT, insert -- ① -- before the formula; and delete "①" at the beginning of the line following the formula.

Column 2,
Line 11, insert -- ① -- before the formula.
Line 12, delete "①"
Line 45, insert -- ④ -- before the formula.
Line 46, delete "④"

Column 5,
Line 49, insert -- ① -- before the formula.
Line 57, delete "①"

Column 6,
Line 58, insert -- ④ -- before the formula.
Line 66, delete "④"

Column 21, claim 1,
Line 3, insert -- ① -- before the formula.
Line 4, delete "①"

Column 21, claim 2,
Line 5, insert -- ① -- before the formula.
Line 6, delete "①"

Column 21, claim 4,
Line 7, insert -- ④ -- before the formula.

Column 22, claim 10,
Line 9, insert -- ① -- before the formula.
Line 10, delete "①"

Column 22, claim 11,
Line 11, insert -- ① -- before the formula.
Line 12, delete "①"

UNITED STATES PATENT AND TRADEMARK OFFICE
CERTIFICATE OF CORRECTION

PATENT NO.    : 6,221,963 B1
DATED         : April 24, 2001
INVENTOR(S)   : Kyoko Kobayashi et al.

It is certified that error appears in the above-identified patent and that said Letters Patent is hereby corrected as shown below:

Column 23, claim 12,
Line 5, insert -- ④ -- before the formula.

Column 24, claim 12,
Line 6, delete "④"
Line 11, change "Q-PxnxS/U" to -- Q=Pxπ xS/U --.

Signed and Sealed this

Twenty-sixth Day of March, 2002

Attest:

*Attesting Officer*

JAMES E. ROGAN
*Director of the United States Patent and Trademark Office*